Figure 1:
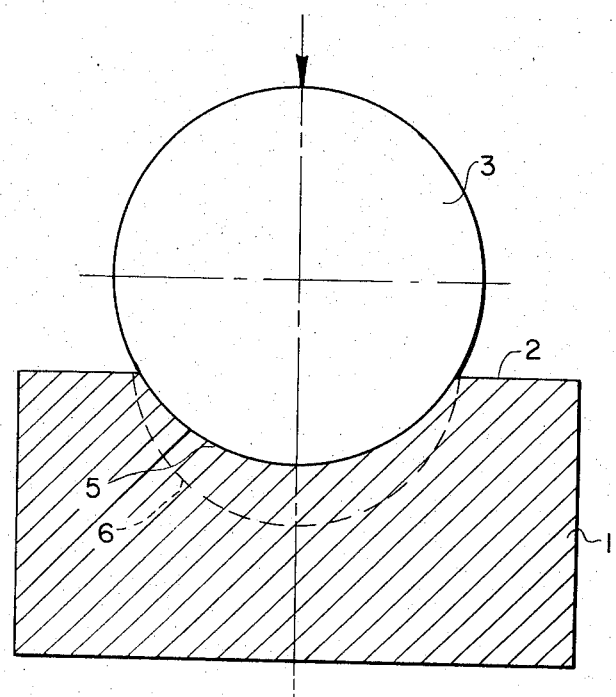

United States Patent [19]
Hepp et al.

[11] 3,833,981
[45] Sept. 10, 1974

[54] PROCESS FOR MAKING A SPHERICAL SEGMENT FOR A SUPPORTING MEMBER OF A SPIRAL GROOVE BEARING

[75] Inventors: Wolfgang Hepp, Immenstaad; Klaus Pimiskern, Friedrichshafen; Werner Herbert, Markdorf, all of Germany

[73] Assignee: Dornier System GmbH, Friedrichshafen, Germany

[22] Filed: June 25, 1973

[21] Appl. No.: 373,135

[30] Foreign Application Priority Data
Aug. 11, 1972 Germany.............................. 2239638

[52] U.S. Cl.. 29/148.4 R, 29/149.5 R, 29/149.5 DP
[51] Int. Cl...................... B21d 53/12, B23p 11/00
[58] Field of Search. 29/148.4 A, 149.5 B, 149.5 R, 29/149.5 DP, 148.4 R

[56] References Cited
UNITED STATES PATENTS
2,783,528  3/1957  Menne.......................... 29/148.4 A Primary Examiner—Thomas H. Eager
Attorney, Agent, or Firm—James E. Bryan, Esquire

[57] ABSTRACT

This invention relates to a process for making a spherical cap or segment for a bearing supporting member of a spiral groove bearing having a spherical shaft end, which comprises pre-stamping a planar end face of a solid body of a hardenable alloy by means of a substantially spherical tool having a greater radius than the spherical cap or segment to be made, to approximately half the depth and nearly the diameter of the segment to be made, and producing the desired exact concave stamping of the spherical cap or segment by a second tool means calibrated to the desired final dimensions of the spherical segment.

3 Claims, 2 Drawing Figures

PROCESS FOR MAKING A SPHERICAL SEGMENT FOR A SUPPORTING MEMBER OF A SPIRAL GROOVE BEARING

The present invention relates to a process for making the spherical cap or segment of a supporting member for hemispherical spiral groove bearings which primarily absorb axial forces, but to a certain extent radial forces as well.

Spiral groove bearings which comprise a rotating shaft having a spherical shaft end, and a stationary supporting member having a counter member corresponding to the spherical shaft end, are very expensive to manufacture because of the high degree of surface accuracy required.

For the useful life and operational efficiency of such bearings, tolerances between the gliding surfaces of less than $1\mu$ are desired, which can be achieved only with great difficulty by mechanical means, particularly in bearings with less than 5 mm diameter. Prior art constructions make use of supporting members which are manufactured by the injection molding process from plastic or other non-metallic materials. The supporting or bearing capacity and accuracy of such supporting members from non-metallic materials suffice, however, only for low bearing stresses. The elasticity of such non-metallic bearing materials as well as the relatively poor heat conductivity of the material allow for only a limited use of such supporting bodies.

Known in the art also are supporting members which consist of a thin-walled shell-like part in which the spherical shaft end is received. These supporting members can be prepared in an economically favorable manner by shaping or deforming, but they have the disadvantage that the bearing gliding plane or surface, particularly in the equatorial area, is reduced because of a transition radius which is present due to the manufacturing process, and for this reason the supporting or carrying capacity of the bearing in the radial direction is very greatly impaired.

It is the object of the present invention to eliminate the disadvantages referred to hereinabove and to provide for a supporting member which has a high degree of surface accuracy and surface quality and which absorbs also radial forces to a very great extent.

This object is obtained, in accordance with the present invention, by virtue of the fact that a solid rotational body having a planar end face and consisting of a hardenable alloy is pre-stamped or -impressed, by means of a spherical tool having a greater radius as compared to the spherical segment to be made, to about half the depth and almost the diaimeter of the segment to be made, and that the exact concave stamping of the spherical segment is produced by means of a second tool calibrated to the final dimensions of the spherical segment. The stamping or impressing operation thus takes place in two successive steps.

The aforementioned manufacturing process produces an exact concave stamping or impression of a spherical cap or segment in a solid body which has a sharp-edged transition to the planar surface. This sharp-edged transition results in a large enclosing angle for the spherical shaft end which enlarges the supporting gliding surfaces and renders the bearing capable of absorbing relatively large radial forces. A further significant advantage of this manufacturing process resides in the surface accuracy of the gliding surfaces which is smaller than $1\mu$. Even in mass production, the tolerances referred to can be maintained without difficulty.

Figure 2:
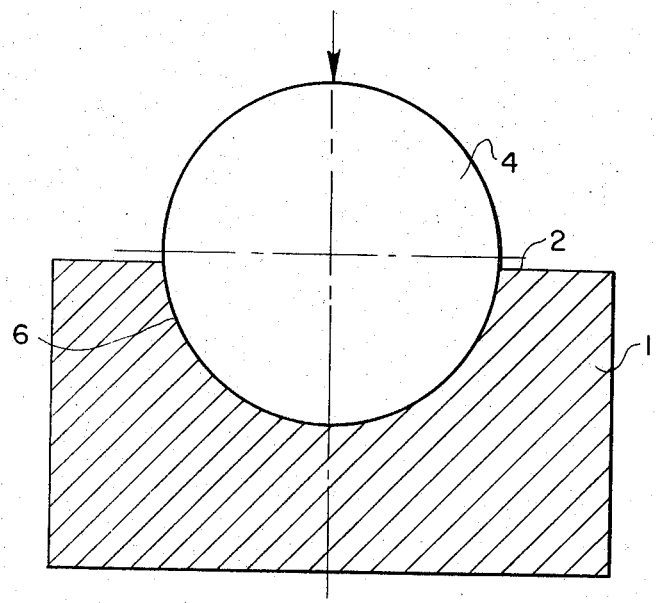

One embodiment of the present invention will now be further described hereinafter with reference to the accompanying drawings, wherein FIG. 1 illustrates the first step of the stamping or impressing operation for a supporting member having a concave imprint; and FIG. 2 illustrates the second step of the stamping or impressing operation.

FIG. 1 illustrates an axially symmetrical solid body 1 and a stamping tool 3 which is used for the first step of the stamping or impressing operation. The desired final impression or stamping 6 of a spherical cap or segment is shown in phantom, as it is intended to be produced after the second step of the stamping or impressing operation. The stamping tool 3 has a spherical configuraion with a radius which is slightly larger than the radius of the final impression or stamping 6. It is pressed into the axially symmetrical solid body 1, which consists of the hardenable alloy BeCu, for example from the planar surface 2 into the solid body so far that the diameter at the equator of the final impression or imprint 6 is nearly reached. During this first step of the stamping operation, the depth of the impression 5 is obtained to approximately half the depth of the final impression 6. The accommodation of the solid body 1 during the stamping operation and the device for receiving the stamping tool are not part of the present invention and have not been shown for this reason.

FIG. 2 illustrates the axially symmetrical solid body 1 and the final stamping tool 4 which may consist, for example, of a ball-bearing sphere. The use of ball-bearing spheres as stamping tools affords the advantage that the sphere can be replaced after each stamping or impressing operation by a new sphere being identical in its dimensions. The essential feature of this two-stage stamping operation resides in that, during the second operating step or stage, the surface of the segment is merely calibrated or graduated in proximity to the equator so that the material flux in this area is small. This low material flux has the result that no rounded-off transition is produced from the planar surface 2 to the segment 6, and a large supporting enclosing or circumferential angle toward the spherical shaft end will be produced. The relatively large enclosing or circumferential angle brings about an increased supporting capacity of the spiral groove bearing in the radial direction. A further advantage of the aforementioned manufacturing process is the high degree of surface quality and surface accuracy.

It will be obvious to those skilled in the art that many modifications may be made within the scope of the present invention without departing from the spirit thereof, and the invention includes all such modifications.

What is claimed is:

1. A process for making a spherical cap or segment for a bearing supporting member of a spiral groove bearing having a spherical shaft end,
    which comprises pre-stamping a planar end face of a solid body of a hardenable alloy by means of a substantially spherical tool having a greater radius than the spherical cap or segment to be made, to approximately half the depth and nearly the diameter of the segment to be made, and producing the desired exact concave stamping of the spherical cap or segment by a second tool means calibrated to the desired final dimensions of the spherical segment.

2. A process according to claim 1 in which the hardenable alloy is BeCu.

3. A process according to claim 1 in which said second tool means is a ball-bearing sphere.

* * * * *